US011489356B2

(12) United States Patent
Berggren et al.

(10) Patent No.: US 11,489,356 B2
(45) Date of Patent: Nov. 1, 2022

(54) MVDC LINK-POWERED BATTERY CHARGERS AND OPERATION THEREOF

(71) Applicant: ABB Schweiz AG, Baden (CH)

(72) Inventors: Bertil Berggren, Västerås (SE); Ritwik Majumder, Vasteras (SE); Robert Saers, Västerås (SE); Frans Dijkhuizen, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/460,517

(22) Filed: Jul. 2, 2019

(65) Prior Publication Data

US 2021/0006085 A1    Jan. 7, 2021

(51) Int. Cl.
| | | |
|---|---|---|
| H02J 7/00 | (2006.01) | |
| H02J 3/32 | (2006.01) | |
| H02J 3/36 | (2006.01) | |
| H02M 7/12 | (2006.01) | |
| H02M 1/00 | (2006.01) | |

(52) U.S. Cl.
CPC .............. *H02J 7/0068* (2013.01); *H02J 3/32* (2013.01); *H02J 3/36* (2013.01); *H02J 7/007* (2013.01); *H02J 7/0021* (2013.01); *H02J 7/0047* (2013.01); *H02M 7/12* (2013.01); *H02J 7/0049* (2020.01); *H02M 1/0067* (2021.05)

(58) Field of Classification Search
CPC .... H02J 7/0068; H02J 3/32; H02J 3/36; H02J 7/0021; H02J 7/0047; H02J 7/007; H02J 7/0049; H02M 7/12; H02M 1/0067
See application file for complete search history.

(56) References Cited

U.S. PATENT DOCUMENTS

| | | | |
|---|---|---|---|
| 4,059,843 | A | 11/1977 | Girismen |
| 4,920,475 | A | 4/1990 | Rippel |
| 4,968,943 | A | 11/1990 | Russo |
| 5,220,668 | A | 6/1993 | Bullis |

(Continued)

FOREIGN PATENT DOCUMENTS

| | | |
|---|---|---|
| DE | 102012002089 | 8/2013 |
| DE | 102018203015 | 5/2019 |

OTHER PUBLICATIONS

Search Report and Written Opinion, PCT Appln. No. PCT/IS2020/056264, 13 pgs, dated Sep. 25, 2020.

(Continued)

*Primary Examiner* — Jue Zhang
(74) *Attorney, Agent, or Firm* — Greenberg Traurig, LLP (57) ABSTRACT

One embodiment is a system comprising a medium voltage direct current (MVDC) link electrically coupling a first AC-DC converter and a second AC-DC converter. The first AC-DC converter is electrically coupled with a first alternating current (AC) feeder. The second AC-DC converter electrically coupled with a second AC feeder. A battery charger electrically coupled with the MVDC link via a converterless connection. A first electronic controller is operatively coupled with the first AC-DC converter. A second electronic controller is operatively coupled with the second AC-DC converter. During operation of the battery charger to charge a battery the first electronic controller is configured to control power flow between the first AC feeder and the second AC feeder and the second electronic controller is configured to control the voltage of the MVDC link.

30 Claims, 6 Drawing Sheets

(56) References Cited

U.S. PATENT DOCUMENTS

| | | |
|---|---|---|
| 5,410,126 A | 4/1995 | Miller |
| 5,541,495 A | 7/1996 | Gali |
| 5,545,046 A | 8/1996 | Masuda |
| 5,633,575 A | 5/1997 | Gali |
| 5,602,462 A | 11/1997 | Stich |
| 5,784,238 A | 7/1998 | Nering |
| 5,815,389 A | 9/1998 | Plow |
| 5,886,954 A | 3/1999 | Asami |
| 6,016,252 A | 1/2000 | Pignolet |
| 6,023,148 A | 2/2000 | Pignolet |
| 6,078,503 A | 6/2000 | Gallagher |
| 6,111,764 A | 8/2000 | Atou |
| 6,112,136 A | 8/2000 | Paul |
| 6,240,337 B1 | 5/2001 | Marr |
| 6,300,847 B1 | 10/2001 | Gallagher |
| 6,523,112 B1 | 2/2003 | Gallagher |
| 6,742,068 B2 | 5/2004 | Gallagher |
| 6,930,897 B2 | 8/2005 | Jungreis |
| 7,980,905 B2 | 7/2011 | Rembach |
| 8,008,811 B2 | 8/2011 | Todd |
| 8,344,677 B2 | 1/2013 | Takizawa |
| 8,428,894 B2 | 4/2013 | Rocci |
| 8,482,945 B2 | 7/2013 | Kojima |
| 8,776,969 B2 | 7/2014 | Asplund |
| 9,000,721 B2 | 4/2015 | Hernandez |
| 9,035,485 B2 | 5/2015 | Tsutsumi |
| 9,099,938 B2 | 8/2015 | Ilic |
| 9,362,781 B2 | 6/2016 | Costa |
| 9,577,430 B2 | 2/2017 | Lee |
| 9,577,564 B2 | 2/2017 | Schifflmann et al. |
| 9,590,452 B2 | 3/2017 | Brogan |
| 9,643,729 B2 | 5/2017 | Walter-Robinson |
| 9,867,263 B2 | 1/2018 | Avrahamy |
| 9,973,032 B2 | 5/2018 | Malone |
| 10,090,777 B2 | 10/2018 | Dent |
| 2004/0150366 A1 | 8/2004 | Ferrall |
| 2005/0135259 A1 | 6/2005 | Yazdi |
| 2005/0141154 A1 | 6/2005 | Consadori |
| 2006/0016627 A1 | 1/2006 | Robertson |
| 2007/0292724 A1 | 12/2007 | Gilchrish |
| 2008/0197706 A1* | 8/2008 | Nielsen .............. H02M 5/40 307/66 |
| 2008/0211308 A1* | 9/2008 | Lin .............. H02J 9/062 307/65 |
| 2009/0072623 A1* | 3/2009 | Liao .............. H02J 9/061 307/65 |
| 2010/0186400 A1 | 7/2010 | Preston |
| 2011/0068746 A1 | 3/2011 | Rocci |
| 2011/0072841 A1 | 3/2011 | Arai |
| 2012/0112669 A1 | 5/2012 | Kitanaka |
| 2013/0093392 A1 | 4/2013 | Odani |
| 2014/0101462 A1 | 4/2014 | Rose |
| 2015/0042292 A1* | 2/2015 | Mao .............. H02J 7/0072 320/162 |
| 2015/0097521 A1 | 4/2015 | Endou |
| 2016/0079859 A1* | 3/2016 | Barbosa .............. H02M 1/4208 363/15 |
| 2016/0197510 A1 | 7/2016 | Strommer |
| 2016/0209901 A1 | 7/2016 | Wilcox |
| 2017/0005909 A1 | 1/2017 | Hunt |
| 2017/0098950 A1 | 4/2017 | Johnson |
| 2017/0155276 A1* | 6/2017 | Harada .............. H02J 7/022 |
| 2017/0264138 A1* | 9/2017 | Shlemenzon .......... H02J 7/0029 |
| 2018/0073628 A1 | 3/2018 | Mouri |
| 2018/0116070 A1 | 4/2018 | Broadbent |
| 2018/0118174 A1 | 5/2018 | Moskowitz |
| 2018/0131049 A1 | 5/2018 | Blanyer |
| 2018/0272968 A1* | 9/2018 | Yasunori .............. H02J 7/0029 |
| 2018/0278149 A1* | 9/2018 | Sano .............. H02M 7/797 |
| 2019/0157986 A1 | 5/2019 | Ginart |
| 2019/0165718 A1 | 5/2019 | Giorgi |
| 2019/0181669 A1 | 6/2019 | Solodovnik |

OTHER PUBLICATIONS

Ake Ekstrom, "High Power Electronics HVDC and SVC", The Royal Instiatue of Technology, Stockholm, XXXX pp. Jun. 30, 1990.

* cited by examiner

MVDC LINK-POWERED BATTERY CHARGERS AND OPERATION THEREOF

BACKGROUND

The present disclosure relates to medium voltage direct current (MVDC) link-powered battery charger and apparatuses, methods, systems, and techniques relating thereto. There have been proposals for the use of AC/DC converters, either directly coupled in a back-to-back relationship or coupled via DC cabling, in electrical power distribution networks in parallel with normally open switches. Such proposals allow for power transfer power between alternating current feeders while also allowing MVDC link bypass by closing the normally open switches. Such proposals offer the potential for enhanced power transfer capability and reduced feeder system power losses, while also maintaining a radial feeder structure. At the same time, there is an increasing need for improvements to battery charging infrastructure such as electric vehicle (EV) battery chargers. There remains a substantial need for the unique apparatuses, methods, systems, and techniques disclosed herein.

DISCLOSURE OF ILLUSTRATIVE EMBODIMENTS

For the purposes of describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY OF THE DISCLOSURE

One embodiment is a unique MVDC link-powered battery charger. Further embodiments, forms, objects, features, advantages, aspects, and benefits shall become apparent from the following description and drawings.

DETAILED DESCRIPTION

Figure 1:
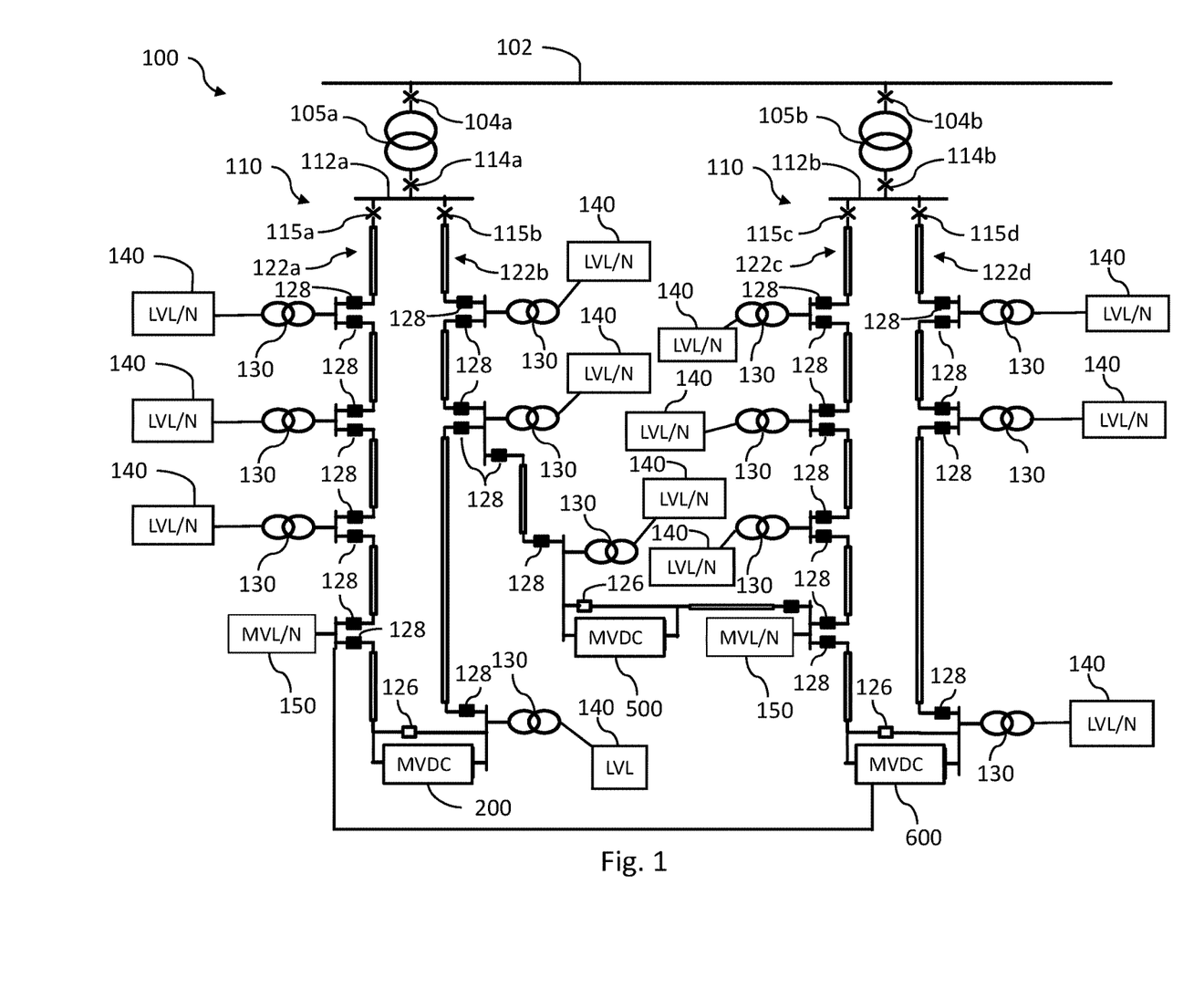
FIG. 1 is a schematic diagram illustrating certain aspects of an example electrical power distribution system.

With reference to FIG. 1, there is illustrated example electrical power distribution system 100 (system 100) including a medium voltage alternating current (MVAC) network 110 which is fed with power from a high voltage alternating current (HVAC) network 102 and which distribute power to a plurality of low voltage alternating current (LVAC) loads or networks. It shall be further appreciated that system 100 is an example of an electrical power distribution system extending over a geographical area such as a municipality or another geographical area including a plurality of loads serviced by the power distribution system, it being appreciated that the density and extent of system 100 may vary from the illustrated example in a number of embodiments.

In general, HVAC refers to voltages in a range suitable for electrical power transmission (e.g., transmission of electrical power from a utility generation source to a primary substation) which may be referred to as transmission voltages, MVAC refers to voltages in a range lower than HVAC and suitable for electrical power distribution (e.g., distribution of electrical power from a primary substation to a secondary or higher order substation or transformer via a distribution network) which may be referred to as distribution voltages, and LVAC voltages are in a range lower than that of MVAC (e.g., voltages suitable for powering customer loads). It shall be appreciated that the voltage ranges for HVAC, MVAC, and LVAC may vary depending on the architecture, capacity, conventions, standards and other variations of a given implementation. In certain applications, voltages from 35 kV to 220 kV may be considered HVAC, voltages ranging from 1 kV to 35 kV may be considered MVAC, and voltages ranging downward from 1 kV may be considered LVAC. In certain applications, the border between HVAC and MVAC may be 110 kV. In other applications, HVAC, MVAC, and LVAC may be considered to have a variety of other ranges than these examples. In the context of battery charging, certain embodiments may utilize MVAC voltages capable providing an acceptable charging rate or capacity for a large battery, as EV batteries and stationary or standby storage batteries, when converted to a DC voltage.

Electrical power from HVAC network 102 is fed to MVAC network 110 via one or more transformers 105a, 105b provided at one or more primary distribution substations. Transformers 105a, 105b are connected to HVAC network 102 via respective breakers 104a, 104b, and are connected to respective medium voltage (MV) bus bars 112a, 112b via respective breakers 114a, 114b. MVAC feeders 122a, 122b, 122c, 122d (collectively referred to as MVAC feeders 122) are connected to the MV bus bars 112a, 112 by breakers 115a, 115b, 115c, 115d. MVAC feeders 122 each comprise a plurality of cable segments coupled with transformers 130 provided at secondary distribution substations which feed respective LVAC loads or networks 140. Switches 128 are provided at each end of the cable segments to allow disconnection of the cable segments from the transformers 130. Switches 128 can be breakers, load switches, disconnectors or other switching devices as may be appropriate for a particular implementation. MV loads or networks such as MV loads or networks 150 may also be connected directly to MVAC feeders 122. It shall be appreciated that components of MVAC network 100 illustrated and described herein (e.g., MVAC feeders 122 and the cabling, bus bars, breakers, transformers, and other elements of system 100) as well as other components as would occur to a person of skill in the art with the benefit of the present disclosure, are examples of distribution voltage alternating current (DVAC) power system circuitry.

In the illustrated example, the primary substation breakers 104a, 104b, 114a, 114b, and the feeder switches 128 are normally closed. Normally open (NO) switches 126 are also provided between respective feeders 122. In this way, the MV distribution network can be operated as a radial network, although it also has meshed network topology characteristics and capabilities. The NO switches 126 may be closed in case of faults such as cable segment faults. Once the faulted cable segment is disconnected, the load below the faulted cable segment can then be served by closing an appropriate one of the NO switches 126. In this way, a radial feeder structure can be maintained both in normal operation and in case of faults.

System 100 further includes one or more medium voltage direct current (MVDC) systems 200, 500, 600 which are connected in parallel with NO switches 126 in the illustrated embodiment, but which may also be provided in other configurations between two or more feeders 122, for example, in configurations without NO switches 126. As further described herein, MVDC systems 200, 500, 600 are examples of MVDC systems providing converterless power supply from MVDC links to battery chargers (although converters may be present at other system locations, e.g., bi-directional AC/DC converters coupled with the DC link and converters other system locations). In other words, MVDC systems 200, 500, 600 are capable of supplying MVDC power directly from an MVDC link to a battery charger without conversion (excluding inherent resistive losses) of the DC voltage to a different operational (i.e., non-zero) voltage level, such as supplying MVDC power without utilizing an intermediate converter (e.g., a DC/DC converter operable to step up or step down from one DC voltage to another).

It shall be appreciated that a number of voltages ranges may be considered to be MVDC depending on the characteristics of a particular implementation or application. In the context of battery chargers, MVDC may be considered to be voltages corresponding to those of batteries having a maximum rated voltage of 50 V or greater, such as electric vehicle (EV) batteries and stationary or standby storage batteries.

Figure 2:
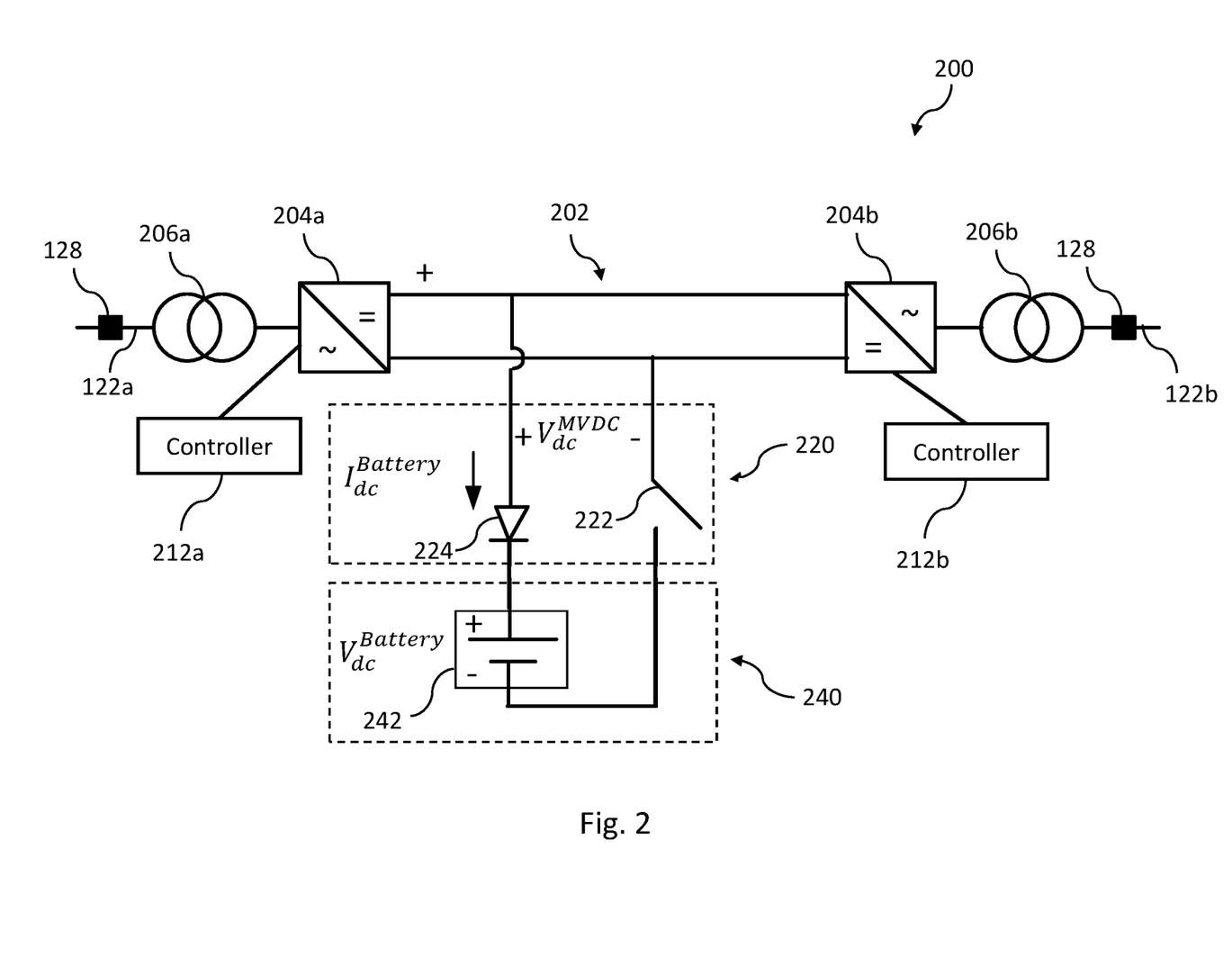
FIG. 2 is a schematic diagram illustrating certain aspects of an example MVDC charger system.

With reference to FIG. 2, there is illustrated example MVDC charger system 200 (system 200). In the illustrated example, system 200 includes an MVDC link 202 which is electrically coupled with and extends between bi-directional AC/DC converters 204a, 204b. Bi-directional AC/DC converters 204a, 204b are also coupled with transformers 206a and 206b which, in turn, are coupled with MVAC feeders 122a, 122b. It shall be appreciated that, in certain forms, transformers 206a and 206b may be omitted and a transformerless connection may be provided between bi-directional AC/DC converters 204a, 204b and MVAC feeders 122a, 122b. It shall be further appreciated that in certain forms, bi-directional AC/DC converters 204a, 204b may be coupled with power system components other than MVAC feeders 122a, 122b, for example, bi-directional AC/DC converters 204a, 204b may be coupled with respective AC buses at a primary substation or another power system location.

An electronic controller 212a (sometimes referred to as controller 212a) is provided in operative communication with and is configured to control the operation of bi-directional AC/DC converters 204a. An electronic controller 212b (sometimes referred to as controller 212b) is provided in operative communication with and is configured to control the operation of bi-directional AC/DC converters 204b.

Electronic controllers 212a, 212b may be provided in a number of forms. In certain forms, electronic controllers 212a, 212b may be integrated circuit-based electronic controllers, for example, one or more microprocessor-based or microcontroller-based electronic controllers. Electronic controllers 212a, 212b may be provided in forms having a single processing or computing component, or in forms comprising a plurality of operatively coupled processing or computing components; and may comprise digital circuitry, analog circuitry, or a hybrid combination of both of these types. The integrated circuitry of electronic controllers 212a, 212b or any of its constituent processors/controllers or other components may include one or more signal conditioners, modulators, demodulators, arithmetic logic units (ALUs), central processing units (CPUs), limiters, oscillators, control clocks, amplifiers, signal conditioners, filters, format converters, communication ports, clamps, delay devices, memory devices, analog to digital (A/D) converters, digital to analog (D/A) converters, and/or different circuitry or functional components as would occur to those skilled in the art to provide and perform the control operations disclosed herein.

System 200 further includes MVDC charger 220 which is coupled with MVDC link 202. One or more batteries such as battery 242 of electric vehicle (EV) 240 may be selectably coupled and decoupled with MVDC charger 220 via a plug or other type of connectors. In the illustrated form, DC link 208 is a symmetric MVDC link whose rated DC voltage corresponds to the voltage of a fully charged standard EV battery, for example, 800 V.

MVDC charger 220 includes a DC switch 222 which can be closed and opened to start and stop EV charging. DC switch 222 may be, for example, a DC load switch with making/breaking capability. A diode 224 is provided to inhibit the battery 242 of EV 240 from feeding a pole-to-pole fault with current. In certain forms, the battery 242 may be used as an energy storage or source for an MVAC grid of which MVAC feeders 122a and 122b form a part. In such forms, a number of alternative circuits may be utilized in place of diode 224 including, for example, a mechanical or solid-state DC breaker, one or more semiconductor switches of the turn-off type, one or more thyristors, or combinations of these and/or other circuit elements such as blocking diodes. This may also be true of other forms regardless of whether battery 242 is used as an energy storage or source for the MVAC grid. It shall be understood that in charging circuitry embodiments which include bidirectional charging/discharging circuitry a storage battery such as a fixed or stationary battery may be coupled with the charging circuitry to receive, store and discharge power as needed or desired.

It shall be appreciated that system 200 is one example of circuitry which supplies power from an MVDC link to a battery charger such as an EV battery charger without utilizing or requiring a converter intermediate the battery and the MVDC link. A number of additional and alternate examples of circuitry which supplies power from an MVDC link to a battery charger such as an EV battery charger without utilizing or requiring a converter intermediate the battery and the MVDC link are also contemplated. Non-limiting examples of additional alternatives and modifications include: variations in the location of the switch, diode and battery, variations in the type of switch, unidirectional element (as discussed above), variations in the structure of the DC bus, variations in the connection of the EV at the DC bus, variations in the number of EV connected at the DC bus, and/or variations in the number of MVDC converters as well as other variations as would occur to one of skill in the art with the benefit of the present disclosure.

Figure 3:
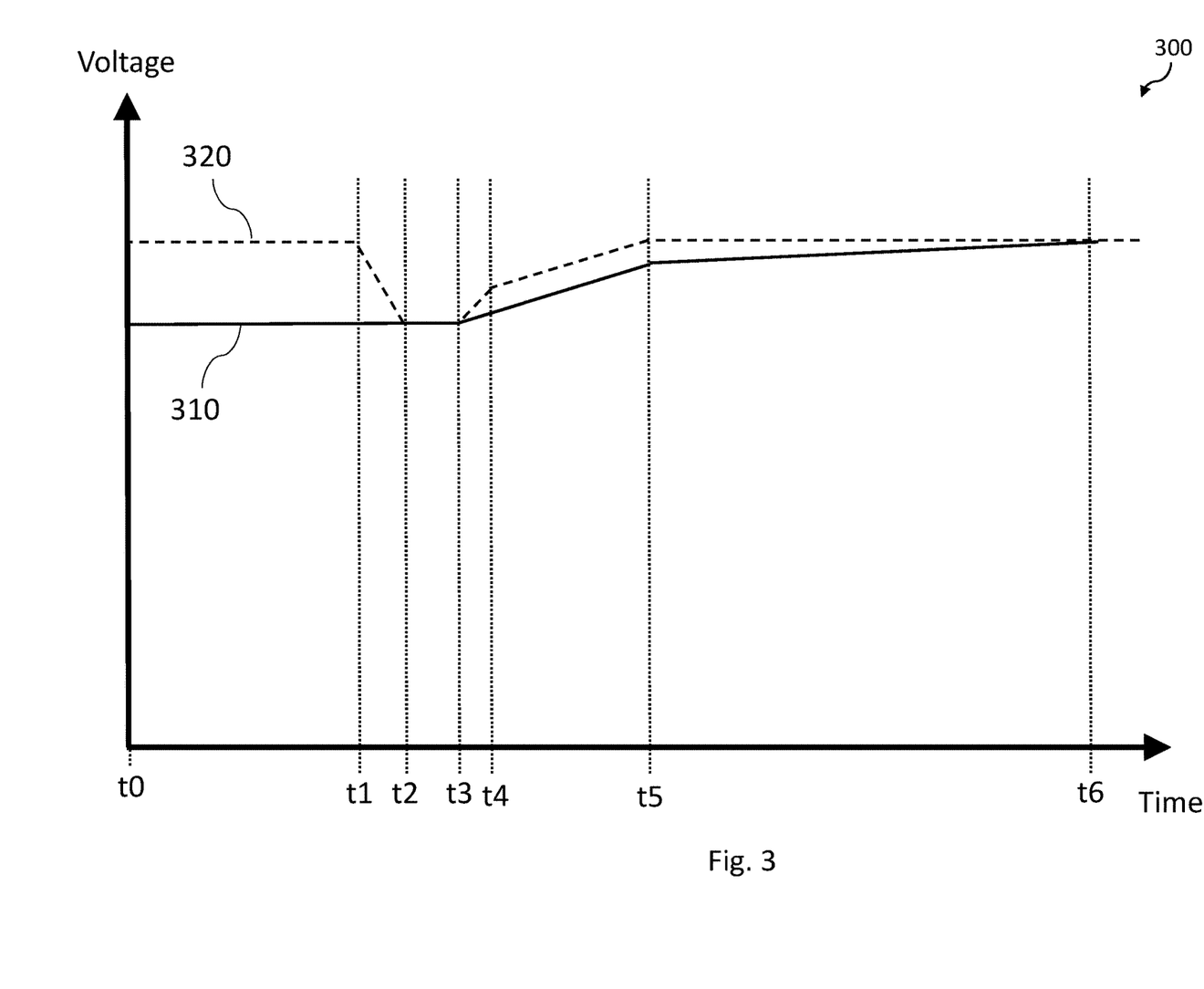
FIG. 3 is a graph illustrating certain aspects of an example charging process which may be performed in connection with an MVDC charger system.

With reference to FIG. 3 there is illustrated a graph depicting certain aspects of an example charging process 300 which may be performed in connection with an MVDC charger system such as system 200. For continuity of description example charging process 300 refers to certain elements of system 200, it being appreciated that the description applies equally to other elements of other systems.

In process 300, curve 310 indicates the voltage of the battery 242 ($V_{dc}^{Battery}$) as a function of time and curve 320 indicates the voltage of the MVDC link 202 ($V_{dc}^{MVDC}$) as a function of time. Between time $t_0$ and time $t_1$, the battery 242 is plugged into the MVDC charger 220, but the load switch 222 is open and the MVDC link 202 is operated at a voltage corresponding to the voltage of a fully charged battery. Between time $t_1$ and time $t_2$, $V_{dc}^{MVDC}$ is ramped down such that it becomes equal to or lower than $V_{dc}^{Battery}$. Between time $t_2$ and time $t_3$, the load switch is closed.

Between time $t_3$ and time t4, $V_{dc}^{MVDC}$ is ramped up until the DC current of the battery 242 ($I_{dc}^{Battery}$) reaches a maximum rated or allowable battery charge current ($I_{dc}^{charge,max}$) or another battery charge current limit which may be established below a maximum rated or allowable battery charge current, for example, to provide for a margin of error or safety, or for reasons of efficiency, or to provide a desired system operation. Under these conditions $V_{dc}^{MVDC}$ has increased to a level greater than $V_{dc}^{Battery}$ and the battery 242 is charging. Between time t4 and time $t_5$, as the battery voltage is increasing with an increased state of charge (SOC), the $V_{dc}^{MVDC}$ also increases over time such that the current $I_{dc}^{Battery}$ remains at $I_{dc}^{charge,max}$.

Between time $t_5$ and time $t_6$, the $V_{dc}^{MVDC}$ reaches the voltage corresponding to a fully charged battery ($V_{dc}^{Battery,max}$). Under these conditions $V_{dc}^{MVDC}$ will not increase further. Instead the current $I_{dc}^{Battery}$ will decrease as the battery 242 is further charged and curves 310 and 320 converge. The battery voltage may asymptotically approach the $V_{dc}^{MVDC}$ which is at a voltage level corresponding to a fully charged battery. At time $t_6$, when the DC current is below a certain threshold, the battery voltage will be close to the MVDC voltage and the battery is considered fully charged. The load switch 222 is opened, charging is stopped, and the EV can be unplugged.

Figure 4:
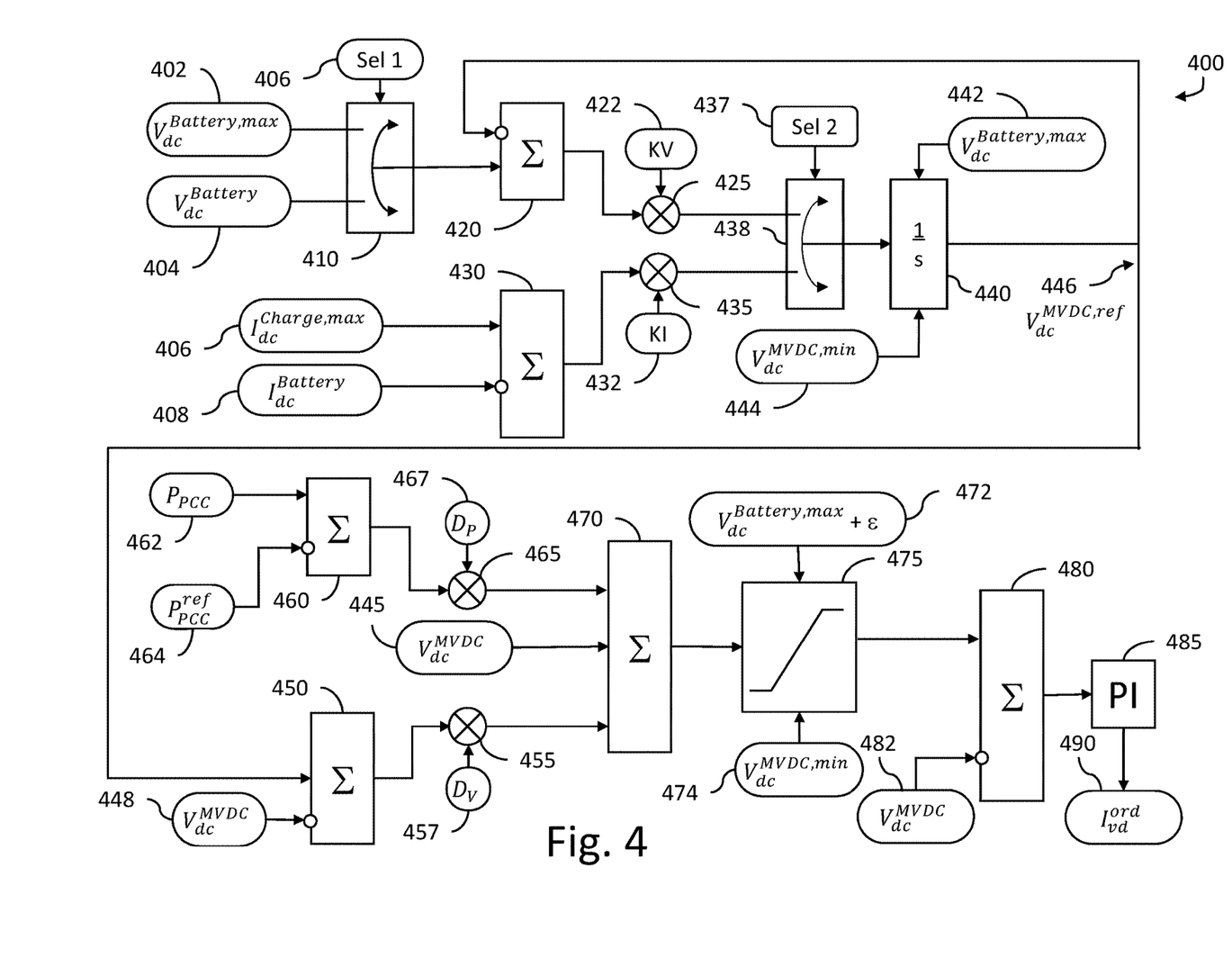
FIG. 4 is a schematic diagram illustrating certain aspects of example controls for an MVDC charger system.

With reference to FIG. 4, there are illustrated example controls 400 which may be utilized to control the operation of an MVDC charger system such as system 200 and which can be configured and operated to perform a charging process in accordance with the example process of FIG. 3. Controls 400 may be implemented in an electronic controller in operative communication with and configured to control the operation of bi-directional AC/DC converters, for example, electronic controllers 212a, 212b or other electronic controllers.

Controls 400 are configured to selectably control the operation of a bi-directional AC/DC converter in a number of modes, including an active power flow control mode and an MVDC link voltage control mode. The active power flow control mode may be selected by setting flag 467 to a true value which turns operator 465 on and by setting flag 457 to a false value which turns operator 455 off. In this mode, active power at the point of common coupling ($P_{PCC}$) is provided as input 462 to operator 460 and a reference value of active power at the point of common coupling ($P_{PCC}^{ref}$) is provided as an input 464 to operator 460. Operator 460 outputs the difference between inputs 462 and input 464 to operator 465 which, when turned on, provides this input to operator 470 which also receives the voltage of the MVDC link ($V_{dc}^{MVDC}$) at input 445 and outputs the sum of these inputs to operator 475.

Operator 475 delimits its received input to a maximum battery voltage plus a small margin ε which is added to allow for a voltage drop between the converters ($V_{dc}^{Battery,max}+\varepsilon$) which is a calibratible value provided at input 472, and a minimum MVDC link voltage $V_{dc}^{MVDC,min}$) which is a calibratible value provided at input 474. For a back-to-back link, the margin (s) may be substantially zero. If DC cabling is present in-between the converters a non-zero margin may be utilized and may be tuned to account for resistance and resistive voltage drop between converters, electrical length, capacitance, inductance, losses and other electrical characteristics of the DC cabling. Operator 475 outputs the delimited value to operator 480 which also receives MVDC link voltage ($V_{dc}^{MVDC}$) as inputs 482 and outputs the difference between these inputs to PI controller 485. The PI controller 485 outputs an ordered current command ($I_{vd}^{ord}$) as output 490 which is used as a control variable to control the current provided by a bi-directional AC/DC converter.

The MVDC link voltage control mode may be selected by setting flag 457 to a true value which turns operator 455 on and by setting flag 467 to a false value which turns operator 465 off. In this mode, operator 450 receives an MVDC link reference voltage ($V_{dc}^{MVDC,ref}$) at input 446 and an MVDC link voltage ($V_{dc}^{MVDC}$) at input 448 and outputs the difference between these inputs to operator 455 which provides this output to operator 470. Operator 470 also receives the voltage of the MVDC link ($V_{dc}^{MVDC}$) at input 445 and outputs the sum of these inputs to operator 475. From this point controls 400 operate in a manner similar to that described above in connection with the active power flow control mode. It should be appreciated that the gains of PI controller 485 may need to be different for the two modes to obtain the desired control performance. It shall also be appreciated that, for a point-to-point DC-link, one converter may be operated in an active power control mode whereas the other is in an MVDC link voltage control mode.

Controls 400 are configured to dynamically adjust the MVDC link reference voltage ($V_{dc}^{MVDC,ref}$) provided at input 446 over time to provide control over a charging process such as charging process 300 described above in connection with FIG. 3. Selection input 406 can be set to cause switch operator 410 to provide either the maximum battery voltage ($V_{dc}^{Battery,max}$) of input 402 or the current battery voltage ($V_{dc}^{Battery}$) of input 404 (i.e., the actual or present battery voltage which may be measured or sensed directly or indirectly, calculated, or approximated) to operator 420 which also receives as feedback the MVDC link reference voltage ($V_{dc}^{MVDC,ref}$) 446 and outputs the difference of these inputs to voltage gain operator 425 which also receives voltage gain input 422 and provides a gain-modified voltage output to switch 438.

Operator 430 receives the maximum charging current ($I_{dc}^{Charge,max}$) at input 406 and the current battery current ($I_{dc}^{Battery}$) at input 408 and outputs the difference of these inputs to current gain operator 435 which also receives current gain input 432 and provides a gain-modified current output to switch operator 438. Switch operator 438 also receives selection input 437 which can be set to cause switch operator 438 to provide either the output of operator 425 or operator 435 to integration operator 440 which integrates the received inputs subject to a maximum battery voltage upper limit ($V_{dc}^{Battery,max}$) and a minimum MVDC link voltage lower limit ($V_{dc}^{MVDC,min}$) and lower limit to provide MVDC link reference voltage ($V_{dc}^{MVDC,ref}$) 446.

In relation to process 300 and system 200, controls 400 may be implemented in controller 212a and 212b. The implementation in controller 212a may be set to active power control mode by setting flag 457 to a false value and setting flag 467 to a true value. The implementation in controller 212b may be set to an MVDC link voltage control mode by setting flag 457 to a true value and setting flag 467 to a false value. Electronic controllers controller 212a and 212b (and potentially additional or alternate electronic controllers) can operate concurrently and independently without input or information of one another.

In an MVDC link voltage control mode, the implementation in controller 212 may be dynamically configured as follows. From time $t_0$ to $t_1$, selection input 437 is set so that switch 438 receives input from voltage gain operator 425 and selection input 406 is set to cause switch operator 410 to provide the maximum battery voltage ($V_{dc}^{Battery,max}$) of input 402 to operator 420 in order to set the MVDC link voltage to the maximum battery voltage. From time $t_1$ to $t_3$, to provide the current battery voltage ($V_{dc}^{Battery}$) of input 404 to operator 420 in order to reduce the MVDC link voltage to the current battery voltage. From time $t_3$ to $t_5$ selection input 437 is set so that switch 438 receives input from current gain operator 435 which causes the MVDC link voltage to increase up to the value that provides the maximum battery charging current. From time $t_5$ to $t_6$ when the MVDC link voltage has reached the maximum battery voltage, selection input 437 is set so that switch 438 receives input from voltage gain operator 425 and selection input 406 is set to cause switch operator 410 to provide the maximum battery voltage ($V_{dc}^{Battery,max}$) of input 402 to operator 420 in order to maintain the MVDC link voltage at the maximum battery voltage.

It shall be appreciated that two or more bi-directional AC-DC converters operatively coupled with a DC link may each include controls 400 or a variation thereof. If both converters are in operation, it is assumed that one is power controlling with $D_P=1$, $D_V=0$ and the other is dc voltage controlling with $D_P=0$, $D_V=1$ where $D_P$ denotes a power control mode flag or setting and $D_V$ denotes a voltage control mode or flag or setting. If one of the converters is out of operation, the remaining may be assumed to be in an MVDC link voltage control mode.

It shall be further appreciated that active power transfer between the converters (and thus between the feeders) is possible during a battery charging cycle. A requirement is that the DC voltage controlling converter can provide the power corresponding to the sum of the power order of the active power controlling converter and the power required to supply the battery when charging. If this does not hold, the power order may be reduced.

It shall also be appreciated that several different operation modes can be noted relative to battery charging. In one mode an active power controlling is operating as rectifier with an active power order less than $P_{charge}^{max}$ which is the maximum charging power (sometimes expressed as C-rate) that can be tolerated by the battery. The DC voltage controlling converter will also be in rectifier mode, and the battery will be charged from both converters.

In another mode, the active power-controlling converter is operating as rectifier with an active power order larger than $P_{change}^{max}$. The DC voltage controlling converter will be in inverter mode, injecting a power corresponding to the active power-order minus the power required for battery charging into the AC network.

In a further mode, the active power controlling converter is operating as an inverter. The DC voltage controlling converter will be in rectifier mode, extracting a power corresponding to the active power-order plus the power required for battery charging from the AC network. In this case, the active power-order for the active power-controlling converter may provide sufficient headroom such that the DC voltage controlling converter does not hit valve current limit.

Figure 5:
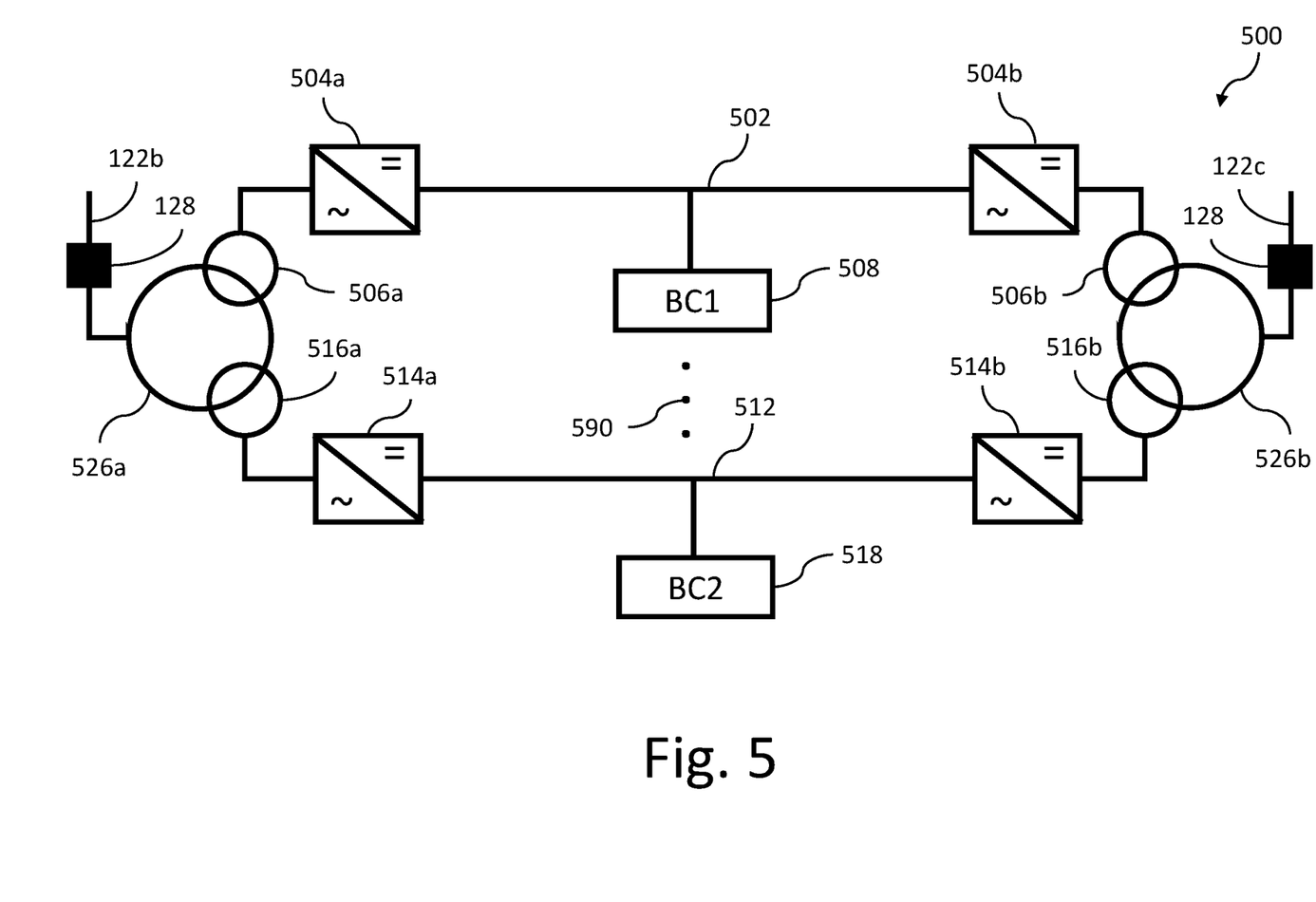
FIG. 5 is a schematic diagram illustrating certain aspects of an example MVDC charger system.

With reference to FIG. 5, there is illustrated example MVDC charger system 500 (system 500) including a first MVDC link 502 which is electrically coupled with and extends between bi-directional AC/DC converters 504a and 504b, and a second MVDC link 512 which is electrically coupled with and extends between bi-directional AC/DC converters 514a and 514b. MVDC links 502 and 512 are electrically coupled with battery chargers 508 and 518, respectively, which may be the same as or similar to MVDC charger 220, may be controlled by controls that are the same as or similar to controls 400 and may perform processes that are the same as or similar to process 300.

Bi-directional AC/DC converters 504a, 504b, 514a, and 514b are operatively coupled with respective electronic controllers (not illustrated) which may be the same as or similar to the electronic controller described above in connection with system 200. Bi-directional AC/DC converters 504a and 514a are electrically coupled with transformer windings 506a and 516a, respectively. Bi-directional AC/DC converters 504b and 514b are electrically coupled with transformer windings 506b and 516b, respectively Transformer windings 506a and 516a are electromagnetically coupled with transformer winding 526a which, in turn, is coupled with feeder 122a. Transformer windings 506b and 516b are electromagnetically coupled with transformer winding 526b which, in turn, is coupled with feeder 122b. As denoted by ellipsis 590, it is contemplated that additional parallel MVDC links, converters, battery chargers, and transformer windings may also be present in certain embodiments.

System 500 may be utilized to provide increased power transfer capability between feeders relative to a system with a single MVDC link by providing two or more MVDC links in parallel. These links could possibly be connected to a transformer with several relatively lower voltage windings (e.g., transformer windings 506a, 506b, 516a, and 516b) coupled with individual ones of the parallel MVDC links (502, 512) and a common relatively higher voltage winding (e.g., transformer windings 526a, 526b) for connection to distribution feeders. Parallel MVDC link arrangements such as system 500 also allow several batteries to be charged independently at the same time.

Figure 6:
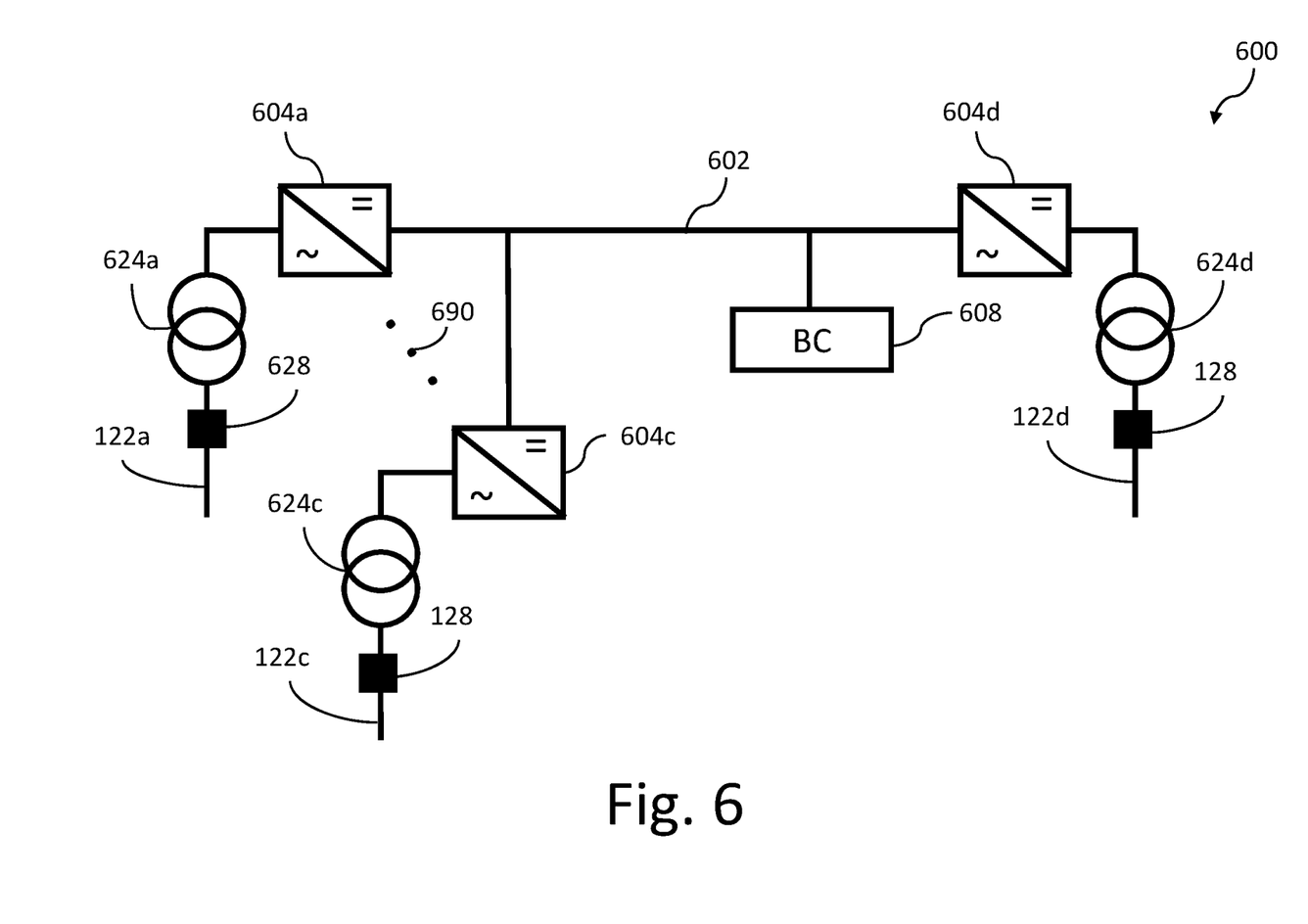
FIG. 6 is a schematic diagram illustrating certain aspects of an example MVDC charger system.

With reference to FIG. 6, there is illustrated example MVDC charger system 600 (system 600) including an MVDC link 602 which is electrically coupled with and extends between bi-directional AC/DC converters 604a, 604c, and 604d. MVDC link 602 is electrically coupled with battery charger 608, which may be the same as or similar to MVDC charger 220, may be operated using controls that are the same as or similar to controls 400 and may perform processes that are the same as or similar to process 300.

Bi-directional AC/DC converters 604a, 604c, and 604d operatively coupled with respective electronic controllers (not illustrated) which may be the same as or similar to the electronic controller described above in connection with system 200. Bi-directional AC/DC converters 604a, 604c, and 604d are electrically coupled with transformers 624a, 624c, and 624d, respectively which, in turn, are coupled with feeders 122a, 122c and 122d, respectively. As denoted by ellipsis 690, it is contemplated that additional MVDC links, converters, and transformers may also be present and coupled with MVDC link 602 in certain embodiments.

In arrangements such as system 600, three or more converters are connected to a common DC-link. Such arrangements may operate such that one converter is in an MVDC link voltage control mode and the other converters are in active power control mode using controls that are the same as or similar to controls 400 and performing processes that are the same as or similar to process 300 for charging a battery. Such arrangements may alternatively operate such that at least two converters operate in a voltage droop control mode in which such converters share DC link voltage control responsibility.

A number of example embodiments and forms and instances thereof shall now be further described. A first example embodiment is a system comprising a medium voltage direct current (MVDC) link electrically coupling a first AC-DC converter and a second AC-DC converter, the first AC-DC converter coupled with first distribution voltage alternating current (DVAC) power system circuitry, the second AC-DC converter coupled with second DVAC power system circuitry; a battery charger electrically coupled with the MVDC link via a converterless electrical connection; a first electronic controller operatively coupled with the first AC-DC converter; and a second electronic controller operatively coupled with the second AC-DC converter; wherein during operation of the battery charger to charge a battery electrically coupled with the battery charger the first electronic controller is configured to control active power flow between the first DVAC power system circuitry and the second DVAC power system circuitry and the second electronic controller is configured to control voltage of the MVDC link to charge the battery.

In certain example forms of the first example embodiment, the first electronic controller and the second electronic controller operate concurrently and independently without information of one another. In certain forms, to control voltage of the MVDC link to charge the battery the second electronic controller is configured to control the MVDC link voltage to match a current battery voltage, increase the MVDC link voltage to provide a battery charging current, and maintain the MVDC link voltage at a maximum battery voltage if the MVDC link voltage reaches the maximum battery voltage. In certain forms, to control the MVDC link voltage to match the current battery voltage the second electronic controller is configured to ramp down the MVDC link voltage from a maximum battery voltage to the current battery voltage. In certain forms, to increase the MVDC link voltage to provide battery charging current the second electronic controller is configured to ramp up the MVDC link voltage until a maximum battery charging current is achieved and thereafter continue to increase the MVDC link voltage as needed to maintain the maximum battery charging current.

Certain such forms of the first example embodiment comprise a second MVDC link electrically coupling a third AC-DC converter and a fourth AC-DC converter, the third AC-DC converter coupled with the first DVAC power system circuitry, the fourth AC-DC converter coupled with the second DVAC power system circuitry; a second battery charger electrically coupled with the second MVDC link via a second converterless connection; a third electronic controller operatively coupled with the third AC-DC converter; and a fourth electronic controller operatively coupled with the fourth AC-DC converter; wherein during operation of the second battery charger to charge a second battery electrically coupled with the second battery charger the third electronic controller is configured to control active power flow between the first DVAC power system circuitry and the second DVAC power system circuitry and the fourth electronic controller is configured to control voltage of the second MVDC link to charge the second battery. In some instances of such forms, the first AC-DC converter and the third AC-DC converter are electromagnetically coupled with the first DVAC power system circuitry by a first transformer including a first lower voltage winding electrically coupled with the first AC-DC converter, a second lower voltage winding electrically coupled with the third AC-DC converter, and a higher voltage winding electrically coupled with the first DVAC power system circuitry, and the second AC-DC converter and the fourth AC-DC converter are electromagnetically coupled with the second DVAC power system circuitry by a second transformer including a third lower voltage winding electrically coupled with the second AC-DC converter, a fourth lower voltage winding electrically coupled with the fourth AC-DC converter, and a second higher voltage winding electrically coupled with the second DVAC power system circuitry.

Certain forms of the first example embodiment comprise a third AC-DC converter electrically coupled with the MVDC link and a coupled with a third DVAC power system circuitry, and a third electronic controller configured to control power flow between the first DVAC power system circuitry and MVDC link. In certain forms, at least one of the first DVAC power system circuitry and the second DVAC power system circuitry is an MVAC feeder. In certain forms, at least one of the first DVAC power system circuitry and the second DVAC power system circuitry is an MVAC bus of a primary substation.

A second example embodiment is a method comprising: providing a system including a medium voltage direct current (MVDC) link electrically coupling a first AC-DC converter and a second AC-DC converter, the first AC-DC converter coupled with a first distribution voltage alternating current (DVAC) feeder, the second AC-DC converter coupled with second DVAC power system circuitry, a battery charger electrically coupled with the MVDC link via a converterless connection, a first electronic controller operatively coupled with the first AC-DC converter, and a second electronic controller operatively coupled with the second AC-DC converter; connecting the battery charger to a battery, and with the battery charger connected to the battery operating the first electronic controller to control power flow between the first DVAC power system circuitry and the second MVAC and operating the second electronic controller to control voltage of the MVDC link to charge the battery.

In certain forms of the second example embodiment, the acts of operating the first electronic controller and operating the second electronic controller occur concurrently and independently without exchanging information between the first electronic controller and the second electronic controller. In certain forms, the act of operating the second electronic controller to control voltage of the MVDC link to charge the battery comprises: controlling the MVDC link voltage to match the current battery voltage, increasing the MVDC link voltage to provide battery charging current, and maintaining the MVDC link voltage at a maximum battery voltage if the MVDC link voltage reaches the maximum battery voltage. In certain forms, the act of controlling the MVDC link voltage to match the current battery voltage the second electronic controller comprises ramping down the MVDC link voltage from a maximum battery voltage to the current battery voltage. In certain forms, the act of increasing the MVDC link voltage to provide a battery charging current comprises ramping up the MVDC link voltage until a maximum battery charging current is achieved and thereafter further increasing the MVDC link voltage as needed to maintain the maximum battery charging current.

Certain such forms of the second example embodiment comprise providing a second MVDC link electrically coupling a third AC-DC converter and a fourth AC-DC converter, the third AC-DC converter coupled with the first DVAC power system circuitry, the fourth AC-DC converter coupled with the second DVAC power system circuitry, a second battery charger electrically coupled with the second MVDC link via a second converterless connection, a third electronic controller operatively coupled with the third AC-DC converter, and a fourth electronic controller operatively coupled with the fourth AC-DC converter; operating the third electronic controller to control active power flow between the first DVAC power system circuitry and the second DVAC power system circuitry; and operating the fourth electronic controller to control the voltage of the second MVDC link to charge the second battery. Certain instances of such forms comprise electromagnetically coupling the first AC-DC converter and the third AC-DC converter with the first DVAC power system circuitry by a first transformer including a first lower voltage winding electrically coupled with the first AC-DC converter, a second lower voltage winding electrically coupled with the third AC-DC converter, and a higher voltage winding electrically coupled with the first DVAC power system circuitry, and electromagnetically coupling the second AC-DC converter and the fourth AC-DC converter with the second DVAC power system circuitry by a second transformer including a third lower voltage winding electrically coupled with the second AC-DC converter, a fourth lower voltage winding electrically coupled with the fourth AC-DC converter, and a second higher voltage winding electrically coupled with the second DVAC power system circuitry.

Certain forms of the second example embodiment providing a third AC-DC converter electrically coupled with the MVDC link and a coupled with a third DVAC power system circuitry, and controlling active power flow between the first DVAC power system circuitry and MVDC link with a third electronic controller. Certain forms comprise providing a third AC-DC converter electrically coupled with the MVDC link and a coupled with a third DVAC power system circuitry, providing a third electronic controller operatively coupled with the third AC-DC converter. Certain forms comprise operating the second controller and the third controller in a voltage droop control mode to provide a voltage drop between the second AC-DC converter and the third AC-DC converter.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:
   a medium voltage direct current (MVDC) link electrically coupling a first AC-DC converter and a second AC-DC converter, the first AC-DC converter coupled with first distribution voltage alternating current (DVAC) power system circuitry, the second AC-DC converter coupled with second DVAC power system circuitry;
   a converterless battery charging circuit including a conductive path directly connected with and electrically connecting the MVDC link and a battery connection node without including a converter structured to convert an operational voltage of the MVDC link to a different operational voltage;
   a first electronic controller operatively coupled with the first AC-DC converter; and
   a second electronic controller operatively coupled with the second AC-DC converter;
   wherein during operation of the converterless battery charging circuit to charge a battery electrically coupled with the converterless battery charging circuit the first electronic controller is configured to control active power flow between the first DVAC power system circuitry and the second DVAC power system circuitry and the second electronic controller is configured to control charging of the battery in response to a voltage of the MVDC link and a reference value which is dynamically variable in response to a battery voltage value and a battery current value.

2. The system of claim 1 wherein the first electronic controller and the second electronic controller operate concurrently and independently without information of one another.

3. The system of claim 1 wherein to control voltage of the MVDC link to
   charge the battery the second electronic controller is configured to: control the MVDC link voltage to match a current battery voltage,
   increase the MVDC link voltage to provide a battery charging current, and
   maintain the MVDC link voltage at a maximum battery voltage if the MVDC link voltage reaches the maximum battery voltage.

4. The system of claim 3 wherein to control the MVDC link voltage to match the current battery voltage the second electronic controller is configured to ramp down the MVDC link voltage from a maximum battery voltage to the current battery voltage.

5. The system of claim 3 wherein to increase the MVDC link voltage to provide battery charging current the second electronic controller is configured to ramp up the MVDC link voltage until a maximum battery charging current is achieved and thereafter continue to increase the MVDC link voltage as needed to maintain the maximum battery charging current.

6. The system of claim 1 comprising a third AC-DC converter electrically coupled with the MVDC link and coupled with a third DVAC power system circuitry, and a third electronic controller configured to control power flow between the first DVAC power system circuitry and MVDC link.

7. The system of claim 1 wherein at least one of the first DVAC power system circuitry and the second DVAC power system circuitry is an MVAC feeder.

8. The system of claim 1 wherein at least one of the first DVAC power system circuitry and the second DVAC power system circuitry is an MVAC bus of a primary substation.

9. The system of claim 1 wherein the conductive path comprises one or more of a DC breaker, a semiconductor switch, a thyristor, and a diode.

10. The system of claim 1 wherein the conductive path comprises a diode configured to inhibit a pole-to-pole fault current.

11. The system of claim 1 comprising the battery conductively coupled with the battery charging node.

12. The system of claim 11 wherein the battery comprises a stationary storage battery.

13. The system of claim 12 wherein the battery comprises an electric vehicle battery.

14. The system of claim 13 wherein the battery connection node comprises a plug configured to selectably couple and decouple with the electric vehicle battery.

15. The system of claim 1, wherein the battery voltage value is selectably determined in response to one of an actual battery voltage value and a predetermined maximum battery voltage value.

16. The system of claim 1, wherein the battery current value varies in response to an actual battery current value and a maximum battery current value.

17. A system comprising:
a medium voltage direct current (MVDC) link electrically coupling a first AC-DC converter and a second AC-DC converter, the first AC-DC converter coupled with first distribution voltage alternating current (DVAC) power system circuitry, the second AC-DC converter coupled with second DVAC power system circuitry;
a battery charger providing a converterless electrical connection between the MVDC link and a battery connector;
a first electronic controller operatively coupled with the first AC-DC converter;
a second electronic controller operatively coupled with the second AC-DC converter; wherein during operation of the battery charger to charge a battery electrically coupled with the battery charger the first electronic controller is configured to control active power flow between the first DVAC power system circuitry and the second DVAC power system circuitry and the second electronic controller is configured to control charging of the battery in response to a voltage of the MVDC link and a reference value which is determined in response to at least one of a battery voltage value and a battery current value.

18. The system of claim 17 wherein
the first AC-DC converter and the third AC-DC converter are electromagnetically coupled with the first DVAC power system circuitry by a first transformer including a first lower voltage winding electrically coupled with the first AC-DC converter, a second lower voltage winding electrically coupled with the third AC-DC converter, and a higher voltage winding electrically coupled with the first DVAC power system circuitry, and
the second AC-DC converter and the fourth AC-DC converter are electromagnetically coupled with the second DVAC power system circuitry by a second transformer including a third lower voltage winding electrically coupled with the second AC-DC converter, a fourth lower voltage winding electrically coupled with the fourth AC-DC converter, and a second higher voltage winding electrically coupled with the second DVAC power system circuitry.

19. The system of claim 17, wherein the battery voltage value varies in response to one of an actual battery voltage value and a predetermined maximum battery voltage value and a feedback of the battery voltage value.

20. The system of claim 17, wherein the battery current value is determined in response to an actual battery current value and a maximum battery current value.

21. The system of claim 17, comprising
a second MVDC link electrically coupling a third AC-DC converter and a fourth AC-DC converter, the third AC-DC converter coupled with the first DVAC power system circuitry, the fourth AC-DC converter coupled with the second DVAC power system circuitry;
a second battery charger electrically coupled with the second MVDC link via a second converterless connection;
a third electronic controller operatively coupled with the third AC-DC converter; and a fourth electronic controller operatively coupled with the fourth AC-DC converter;
wherein during operation of the second battery charger to charge a second battery electrically coupled with the second battery charger the third electronic controller is configured to control active power flow between the first DVAC power system circuitry and the second DVAC power system circuitry and the fourth electronic controller is configured to control voltage of the second MVDC link to charge the second battery.

22. A method comprising:
providing a system including a medium voltage direct current (MVDC) link electrically coupling a first AC-DC converter and a second AC-DC converter, the first AC-DC converter coupled with first distribution voltage alternating current (DVAC) power system circuitry, the second AC-DC converter coupled with second DVAC power system circuitry, a battery charger electrically coupling the MVDC link and a battery connector via a converterless connection, a first electronic controller operatively coupled with the first AC-DC converter, and a second electronic controller operatively coupled with the second AC-DC converter;
connecting the battery charger to a battery via a converterless conductive path directly connected with and electrically connecting the MVDC link and the battery,
with the battery charger connected to the battery operating the first electronic controller to control power flow between the first DVAC power system circuitry and the second MVAC and operating the second electronic controller to control voltage of the MVDC link to charge the battery without converting an operational voltage of the MVDC link to a different operational voltage;
providing a second MVDC link electrically coupling a third AC-DC converter and a fourth AC-DC converter, the third AC-DC converter coupled with the first DVAC power system circuitry, the fourth AC-DC converter coupled with the second DVAC power system circuitry, a second battery charger electrically coupled with the second MVDC link via a second converterless connection, a third electronic controller operatively coupled with the third AC-DC converter, and a fourth electronic controller operatively coupled with the fourth AC-DC converter;

operating the third electronic controller to control active power flow between the first DVAC power system circuitry and the second DVAC power system circuitry; and operating the fourth electronic controller to control the voltage of the second MVDC link to charge the second battery.

23. The method of claim 22 wherein the acts of operating the first electronic controller and operating the second electronic controller occur concurrently and independently without exchanging information between the first electronic controller and the second electronic controller.

24. The method of claim 22 wherein the act of operating the second electronic controller to control voltage of the MVDC link to charge the battery comprises:
controlling the MVDC link voltage to match the current battery voltage, increasing the MVDC link voltage to provide battery charging current, and
maintaining the MVDC link voltage at a maximum battery voltage if the MVDC link voltage reaches the maximum battery voltage.

25. The method of claim 24 wherein the act of controlling the MVDC link voltage to match the current battery voltage the second electronic controller comprises ramping down the MVDC link voltage from a maximum battery voltage to the current battery voltage.

26. The method of claim 24 wherein the act of increasing the MVDC link voltage to provide a battery charging current comprises ramping up the MVDC link voltage until a maximum battery charging current is achieved and thereafter further increasing the MVDC link voltage as needed to maintain the maximum battery charging current.

27. The method of claim 22 comprising
electromagnetically coupling the first AC-DC converter and the third AC-DC converter with the first DVAC power system circuitry by a first transformer including a first lower voltage winding electrically coupled with the first AC-DC converter, a second lower voltage winding electrically coupled with the third AC-DC converter, and a higher voltage winding electrically coupled with the first DVAC power system circuitry, and electromagnetically coupling the second AC-DC converter and the fourth AC-DC converter with the second DVAC power system circuitry by a second transformer including a third lower voltage winding electrically coupled with the second AC-DC converter, a fourth lower voltage winding electrically coupled with the fourth AC-DC converter, and a second higher voltage winding electrically coupled with the second DVAC power system circuitry.

28. The method of claim 22 comprising providing a third AC-DC converter electrically coupled with the MVDC link and a coupled with a third DVAC power system circuitry, and controlling active power flow between the first DVAC power system circuitry and MVDC link with a third electronic controller.

29. The method of claim 22 comprising providing a third AC-DC converter electrically coupled with the MVDC link and coupled with a third DVAC power system circuitry, providing a third electronic controller operatively coupled with the third AC-DC converter.

30. The method of claim 29 comprising operating the second controller and the third controller in a voltage droop control mode wherein the second AC-DC converter and the third AC-DC converter share DC link voltage control responsibility.

* * * * *